United States Patent [19]
Higuchi et al.

[11] Patent Number: 5,953,188
[45] Date of Patent: Sep. 14, 1999

[54] ELECTRIC APPARATUS HAVING A SYNTHETIC RESIN UPPER COVER AND SHIELD PLATE

[75] Inventors: Yoshio Higuchi; Osamu Maeda; Toshiaki Irie; Hiroshi Inoue, all of Daito, Japan

[73] Assignee: Funai Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/565,946

[22] Filed: Dec. 1, 1995

[30] Foreign Application Priority Data

Dec. 1, 1994 [JP] Japan ................................. 6-015909

[51] Int. Cl.$^6$ ........................................ G11B 5/00
[52] U.S. Cl. ........................................... 360/137
[58] Field of Search ................ 360/137, 84, 85, 360/95, 97.01, 97.02, 130.23; 361/679, 816, 685, 818; 348/836

[56] References Cited

U.S. PATENT DOCUMENTS

| | | | |
|---|---|---|---|
| 4,521,062 | 6/1985 | Kurbikoff et al. | 339/14 R |
| 4,649,461 | 3/1987 | Matsuta | 361/415 |
| 4,737,597 | 4/1988 | Tomiya et al. | 174/35 R |
| 4,810,048 | 3/1989 | Asano et al. | 350/96.11 |
| 4,825,316 | 4/1989 | Kishi et al. | 360/97.02 |
| 4,891,726 | 1/1990 | Suwa et al. | 360/130.23 |
| 4,930,029 | 5/1990 | Morita | 360/97.01 |
| 5,025,335 | 6/1991 | Stefansky | 360/97.01 |
| 5,195,001 | 3/1993 | Murakami et al. | 360/85 |
| 5,243,495 | 9/1993 | Read et al. | 361/685 |
| 5,282,099 | 1/1994 | Kawagoe et al. | 360/97.01 |
| 5,291,349 | 3/1994 | Yamaguchi | 360/84 |
| 5,313,348 | 5/1994 | Oouchi et al. | 360/84 |
| 5,392,197 | 2/1995 | Cuntz et al. | 361/818 |
| 5,416,668 | 5/1995 | Benzoni | 361/818 |
| 5,497,280 | 3/1996 | Nemoto et al. | 360/95 |
| 5,500,789 | 3/1996 | Miller et al. | 361/818 |
| 5,544,142 | 8/1996 | Funakiri | 360/137 |
| 5,561,265 | 10/1996 | Livshits et al. | 361/818 |
| 5,673,090 | 9/1997 | Higuchi et al. | 348/836 |

FOREIGN PATENT DOCUMENTS

2-94192  4/1990  Japan ................................. 360/97.02

*Primary Examiner*—Brian E. Miller
*Attorney, Agent, or Firm*—Bacon & Thomas

[57] ABSTRACT

An electric apparatus such as a recording apparatus, having a cabinet. The cabinet includes a chassis case and an upper cover, the chassis case having a medium inserting opening in a front surface thereof. The cabinet accommodates therein at least a printed wiring board and a mechanical deck. The printed wiring board mounts thereon electronic parts for system control and the mechanical deck mounts thereon medium and head drive mechanisms, the mechanical deck being arranged at a predetermined position on the board. The upper cover of the cabinet is made of a synthetic resin material.

15 Claims, 7 Drawing Sheets

ELECTRIC APPARATUS HAVING A SYNTHETIC RESIN UPPER COVER AND SHIELD PLATE

BACKGROUND OF THE INVENTION

1. Field of the Invention

The invention relates to an electric apparatus such as a magnetic tape apparatus (such as a video tape recorder and a video tape player) that accommodates, within a cabinet having such a structure as to insert a medium from a front surface thereof (front loading structure), a board that mounts thereon electronic parts for recording or reproducing the medium and a mechanical deck that mounts thereon drive mechanisms. The recording medium includes a magneto-optical disk, an optical disk, a magnetic disk, and a magnetic tape.

2. Description of the Related Art

As a conventional example of a front loading type electric apparatus, a helical scan type magnetic recording/reproducing apparatus using magnetic heads arranged on a rotary cylinder will be described.

Figure 7A:
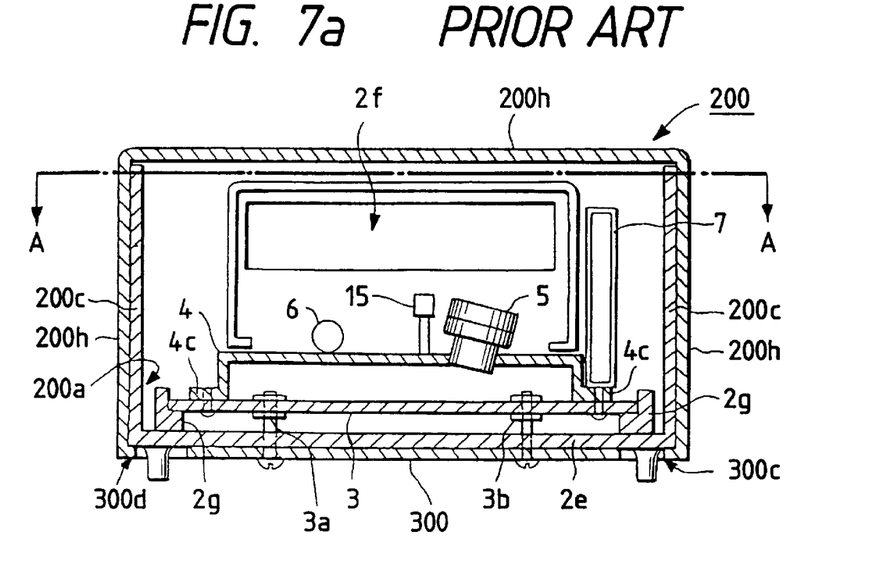
FIGS. 7a and 7b are explanatory views illustrative of a conventional example.
Figure 7B:
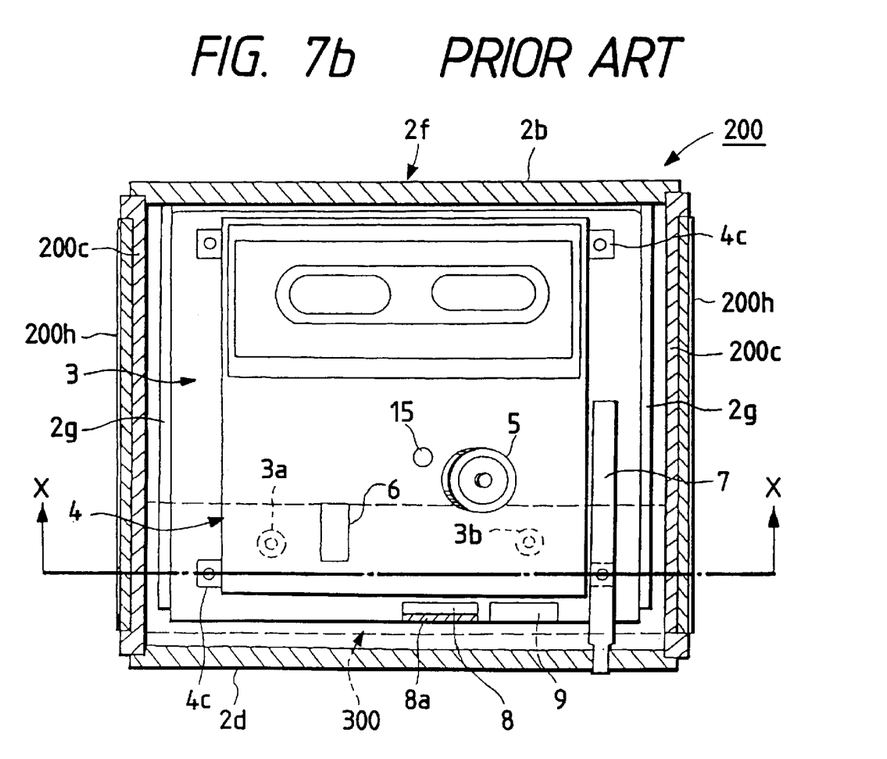
Figure 8:
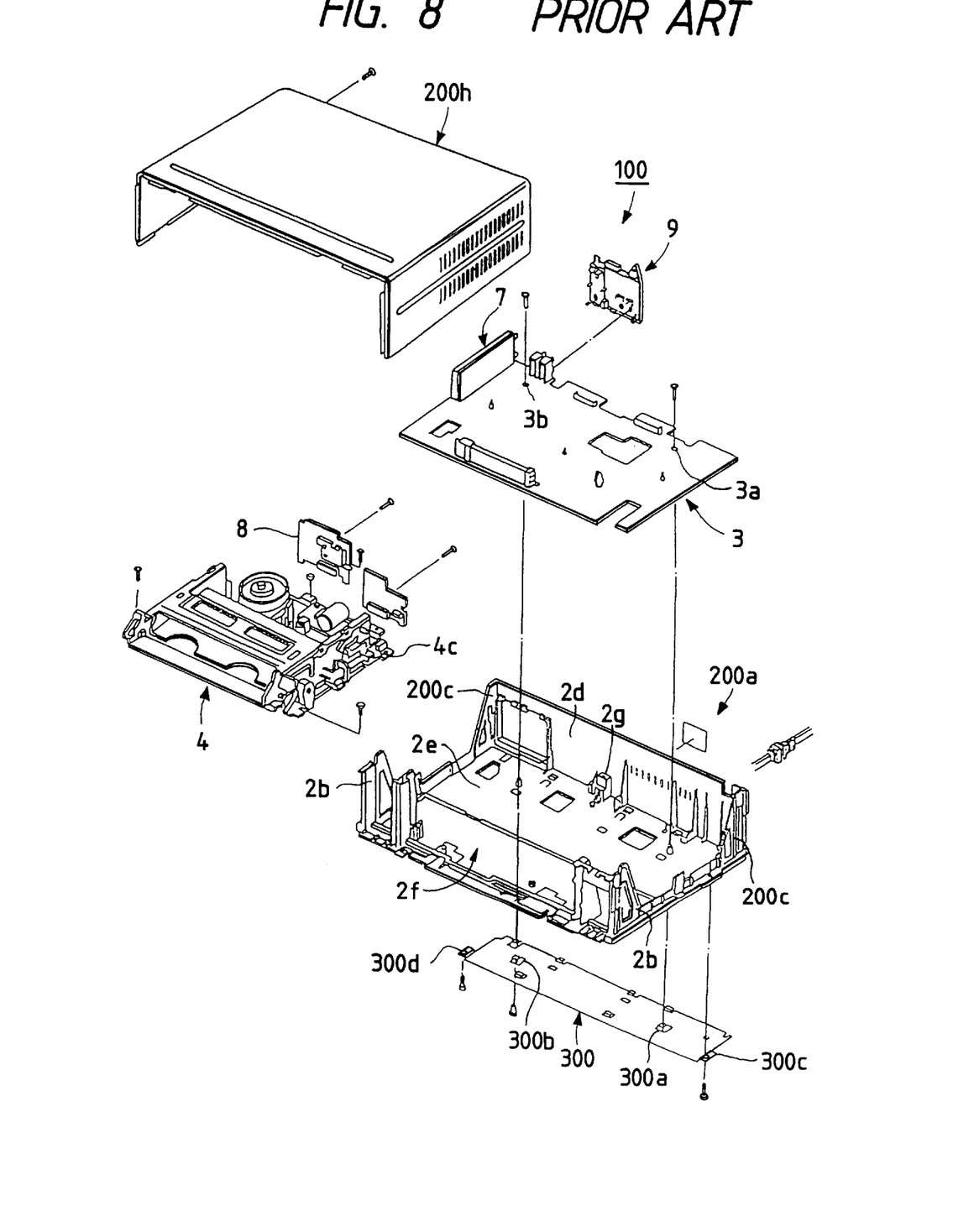
FIG. 8 is an exploded perspective view of the conventional example.

FIG. 7a is a sectional view illustrative of a magnetic recording/reproducing apparatus 100 as viewed from the rear surface thereof; and FIG. 7b is a sectional view thereof as viewed from the top surface thereof. FIG. 7a is a longitudinal sectional view taken along a line X—X of FIG. 7b; and FIG. 7b is a transverse sectional view taken along a line A—A of FIG. 7a. FIG. 8 is an exploded perspective view of the actual apparatus.

In FIGS. 7a, 7b and 8, a board that mounts electronic devices of the magnetic recording/reproducing apparatus 100 and a mechanical deck that mounts mechanical parts of the apparatus 100 are accommodated in a cabinet 200. The cabinet 200 includes a chassis case 200a made of a synthetic resin material and an upper cover 200h made of an iron plate. The chassis case 200a has a chassis case front plate 2b in the front thereof. A cassette inserting opening 2f is arranged in the chassis case front plate 2b. The cassette of a magnetic tape (a medium) is inserted through this opening 2f and loaded. It may be noted, however, that the front plate 2b is arranged only at both end portions in the actual example shown in FIG. 8.

Further, chassis case side plates 200c are arranged on both side surfaces of the chassis case 200a so as to overlap on the side surface portions of the upper cover 200h. It may be noted, however, that the chassis case side plates 200c are arranged with the middle portions thereof cut out in the actual example shown in FIG. 8. Still further, a chassis case rear plate 2d and a chassis case bottom plate 2e are arranged on the rear surface and the bottom surface of the chassis case 200a. Reference character 2g designates a support guide for a printed wiring board 3, which is positioned differently between the case of FIG. 7a, 7b and the case of FIG. 8.

The printed wiring board 3 has electronic parts mounted thereon. Reference character 3a designates a power supply ground terminal; and 3b, an input/output jack ground terminal.

Reference character 300 designates a ground plate made of a metallic material; 4, a mechanical deck; and 4c, holes for fixing the mechanical deck to the board 3.

Reference character 5 designates a magnetic head rotary cylinder; 6, a mechanism drive motor; 7, a tuner; 8, a magnetic head amplifier board; 8a, a shield plate for the magnetic head amplifier board 8; 9, a jack board, which is a plate for fixing an input/output jack that is a signal input/output terminal; and 15, an audio head.

Electric shielding of the cabinet 200 and grounding of the board are provided as follows. Since the upper cover 200h is made of metal, the upper and side surfaces of the upper cover 200h shield the inside of the cabinet 200 from electric interference. The ground plate 300 provides grounding by connecting nuts 300a, 300b to the ground terminals 3a, 3b through machine screws and further by connecting both ends 300c, 300d of the ground plate 300 to the lower sides of both side plates of the upper cover 200h as shown in FIGS. 7a, 7b and 8.

Needs for this type of electric apparatus based on users, preference are diversified in present days. In order to meet the needs, suppliers have diversified exterior color and shape in particular. However, the materials of which the conventional example are made have imposed restrictions on possible diversifications of the electric apparatus. It has also been difficult to paint the cabinet with a single color due to the difference in material used between the upper surface and the side surfaces. In addition, different thermal expansion coefficients due to the difference in material have made the supplier to take this factor into consideration in determining the dimensions of parts, making the designing work hard.

SUMMARY OF THE INVENTION

The invention has been made to overcome the aforementioned problems. The object of the invention is, therefore, to provide an electric apparatus whose upper cover is made of a synthetic resin material and in which an irreducibly minimized shield plate is employed.

In attaining the above object, the invention provides an electric apparatus comprising: a cabinet including a chassis case and an upper cover, the chassis case having a medium inserting opening in a front surface thereof; a printed wiring board mounting thereon electronic parts for system control, the printed wiring board being accommodated in the cabinet; and a mechanical deck mounting thereon medium and drive mechanisms, the mechanical deck being arranged at a predetermined position on the printed wiring board and being accommodated in the cabinet, wherein the chassis case and the upper cover of the cabinet are made of a synthetic resin material.

DETAILED DESCRIPTION OF THE PREFERRED EMBODIMENT

An embodiment of the invention will now be described with reference to the case where the invention is applied to a front loading type electric apparatus.

A helical scan type magnetic recording/reproducing apparatus having at least two magnetic heads disposed on a rotary cylinder will be taken as an example.

Figure 1:
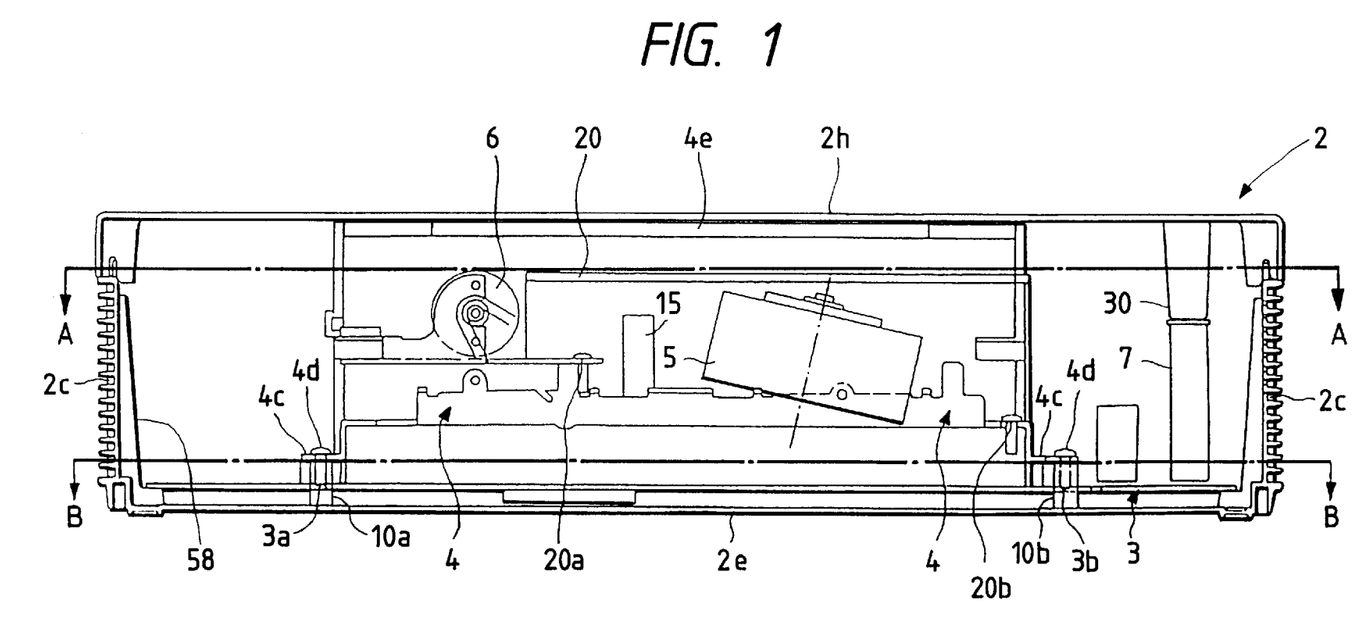
FIG. 1 is an explanatory view illustrative of an embodiment of the invention.
Figure 2:
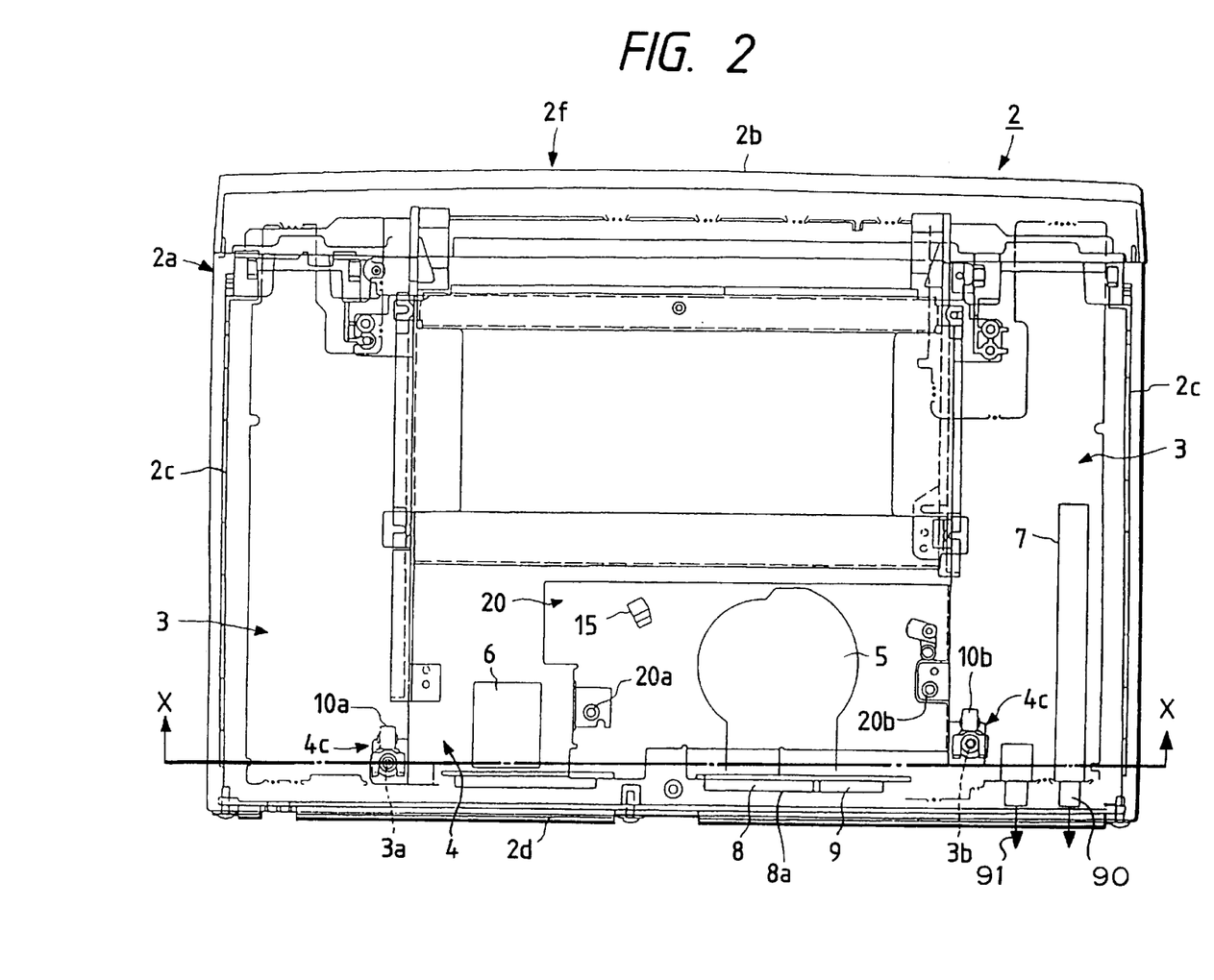
FIG. 2 is an explanatory view illustrative of the embodiment of the invention.

FIGS. 1 and 2 are explanatory views illustrative of the magnetic recording/reproducing apparatus 1; i.e., FIG. 1 is a sectional view thereof as viewed from the rear, and FIG. 2 is a sectional view thereof as viewed from the top. FIG. 1 is a longitudinal sectional view taken along a line X—X of FIG. 2, and FIG. 2 is a transverse sectional view taken along a line A—A of FIG. 1.

Figure 3:
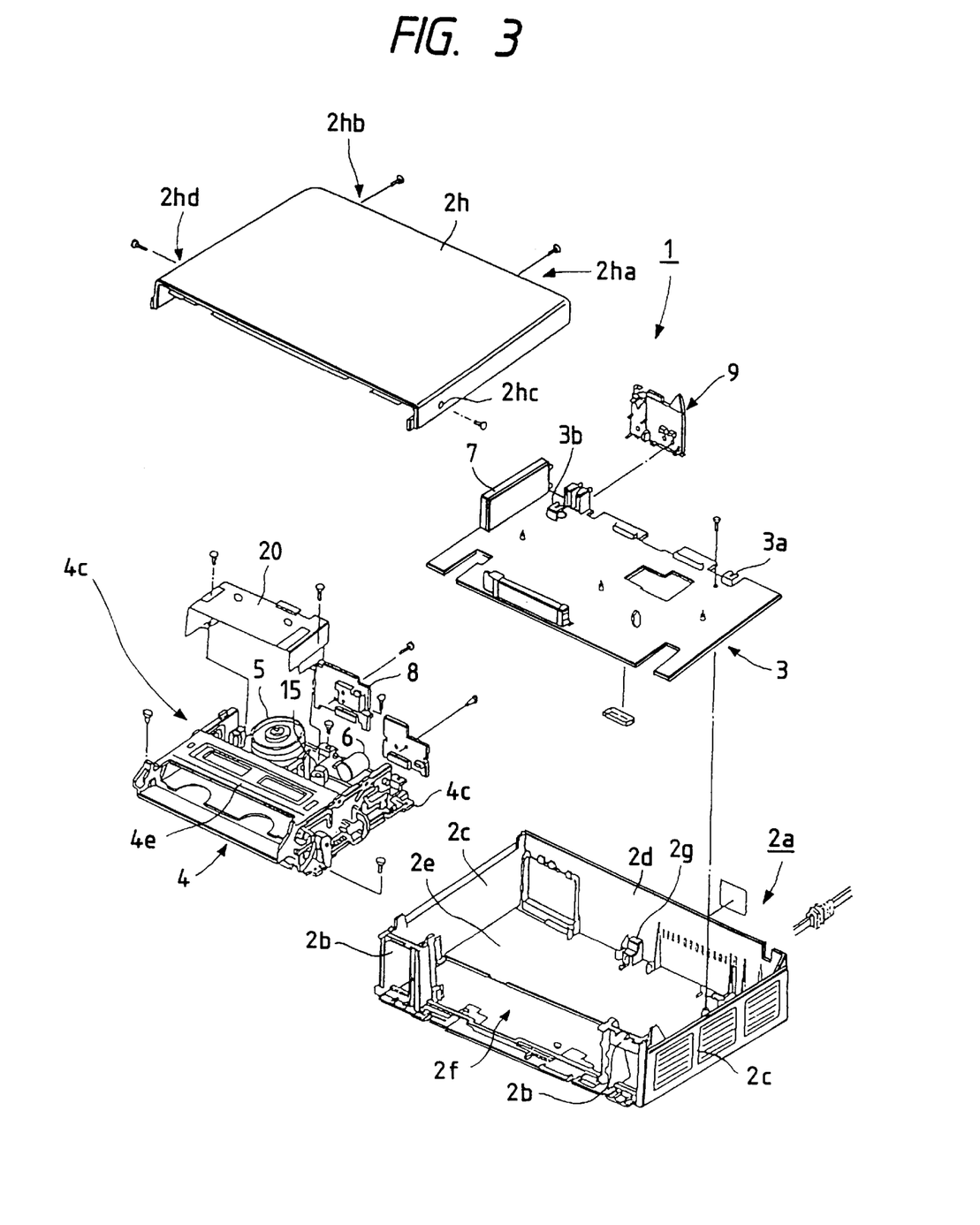
FIG. 3 is an exploded perspective view of the embodiment of the invention.

FIG. 3 is an exploded perspective view of an actual apparatus to which the invention is applied. In FIGS. 1, 2 and 3, the same parts and components as those in FIGS. 7a, 7b and 8 are designated as the same reference characters, and the description of these parts and components will be omitted. A printed wiring board 3 that mounts electronic parts of the magnetic recording/reproducing apparatus 1, such as tuner 7, antenna in/out connector 90, and video output connector 91, and a mechanical deck 4 that mounts mechanical parts thereof, are accommodated in a cabinet 2. Here, the cabinet 2 includes a chassis case 2a and an upper cover 2h. The upper cover 2h and the chassis case 2a are formed by molding a synthetic resin material. A chassis case front plate 2b is arranged in the front of the chassis case 2a and has a cassette inserting opening 2f in the middle thereof. Chassis case side plates 2c are arranged on both side surfaces of the chassis case 2a.

The mechanical deck 4 that mounts head drive mechanisms is placed on printed wiring board 3. The mechanical deck 4 is fixed to bosses erected on the board 3 through machine screws 4d with fixing holes 4c of the mechanical deck 4 being aligned with tonguelike strips 10a and 10b that extend from terminals 3a and 3b of the board 3. The mechanical deck 4 is therefore connected to the power supply ground terminal 3a and the signal input/output ground terminal 3b through the tonguelike strips 10a and 10b that are grounding leads of the mechanical deck 4. As a result, not only the power supply ground terminal 3a, the signal input/output ground terminal 3b, and a ground terminal (not shown) of tuner 7 are short-circuited, but also the function of shielding video heads of a rotary cylinder 5 and an audio head 15 from extraneous electromagnetic waves coming from the lower side of the cabinet can be performed by the mechanical deck 4.

Therefore, the conventional ground plate 300 is no longer necessary.

It may be noted that the tonguelike strips 10a and 10b extending from the power supply ground terminal 3a and the signal input/output ground terminal 3b are tonguelike grounding leads formed out of a pattern on the board 3.

Reference character 20 designates a shield plate made of metal (e.g., iron) for electromagnetic and electrostatic shielding. The shield plate 20 is square C-shaped. Assuming a case where a shield plate made of a material that is effective only for either electromagnetic shielding or electrostatic shielding (e.g., a magnetic material or stainless steel) is used instead of the shield plate for electromagnetic and electrostatic shielding, such a shield plate is better than a case where no shield plate is used. The upper side plate of the electromagnetic and electrostatic shield plate 20 is interposed between the upper cover 2h and the rotary cylinder 5, and the shield plate 20 is fixed to the mechanical deck 4 through machine screw holes 20a and 20b at the lower ends of both side plates of the plate 20.

The shield plate 20 electrically shields at least the rotary cylinder 5, the audio head 15, and the electric wire from the audio head to an amplifier, and also an audio circuit (not shown) mounted on the rear surface of the board 3 from the extraneous electromagnetic waves and electric fields coming from above and from sides. The size of the metal plate can be reduced to the irreducible minimum. Further, the shield plate 20 prevents the upper cover 2h from flexing.

Since the fixing holes 4c for fixing the mechanical deck 4 to the board 3 and the ground terminals 3a and 3b of the board 3 are aligned in terms of position coordinates on the plane, the grounding leads (the tonguelike strips 10a and 10b in the example of FIG. 1) extend in the vertical direction in FIGS. 1, 2, and 3. That is, the connecting of the ground terminals of the board 3 and the fixing of the board 3 to the mechanical deck 4 are effected simultaneously through long screws. It may be noted that if the position coordinates on the plane are not aligned, the grounding leads extend in the horizontal direction.

Further, by fixing a fixing plate 9 of a signal input/output jack using an upper cover mounting machine screw through a fixing hole 2hb of the upper cover 2h of the cabinet 2, a fixing machine screw member of the fixing plate 9 can be eliminated. In addition, by fixing the fixing plate 9 of the signal input/output jack so as to engage with a groove of a recessed and projected structure of the fixing member of the upper cover 2h, the fixing machine screw member can also be eliminated.

Further, fixing holes 2ha, 2hb, 2hc, and 2hd are provided in the upper cover 2h so that the upper cover 2h can be fixed to the upper surfaces of the chassis case 2a.

A fixing member 30 having a recessed and projected structure may be formed in the inner side of the upper cover 2h. If the fixing member is molded integrally with the upper cover 2h out of the synthetic resin material so that the fixing member has a recessed and projected structure that is opposite to the main part of the recessed and projected structure of the mechanical deck 4 as viewed from the top, then the mechanisms and the electronic parts contained within the cabinet 2 can be held stably. As a result, a more reliable cabinet 2 can be provided. For example, in the embodiment, illustrated in FIG. 1, a fixing member 30 is in the form of a boss provided at a position corresponding to the tuner 7 on the upper cover 200h as shown in FIG. 1, so as to prevent the board 3 on which the tuner 7 is mounted from breaking in a case where a strong shock is applied to the apparatus.

Figure 4:
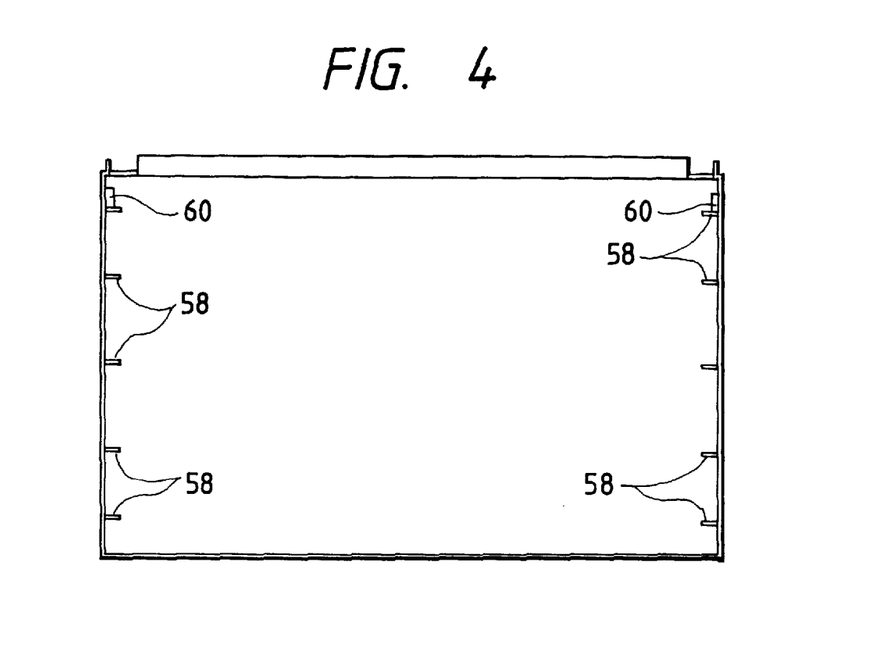
FIG. 4 is a view showing the construction of a chassis case close to an upper cover of a cabinet in the embodiment.
Figure 5:
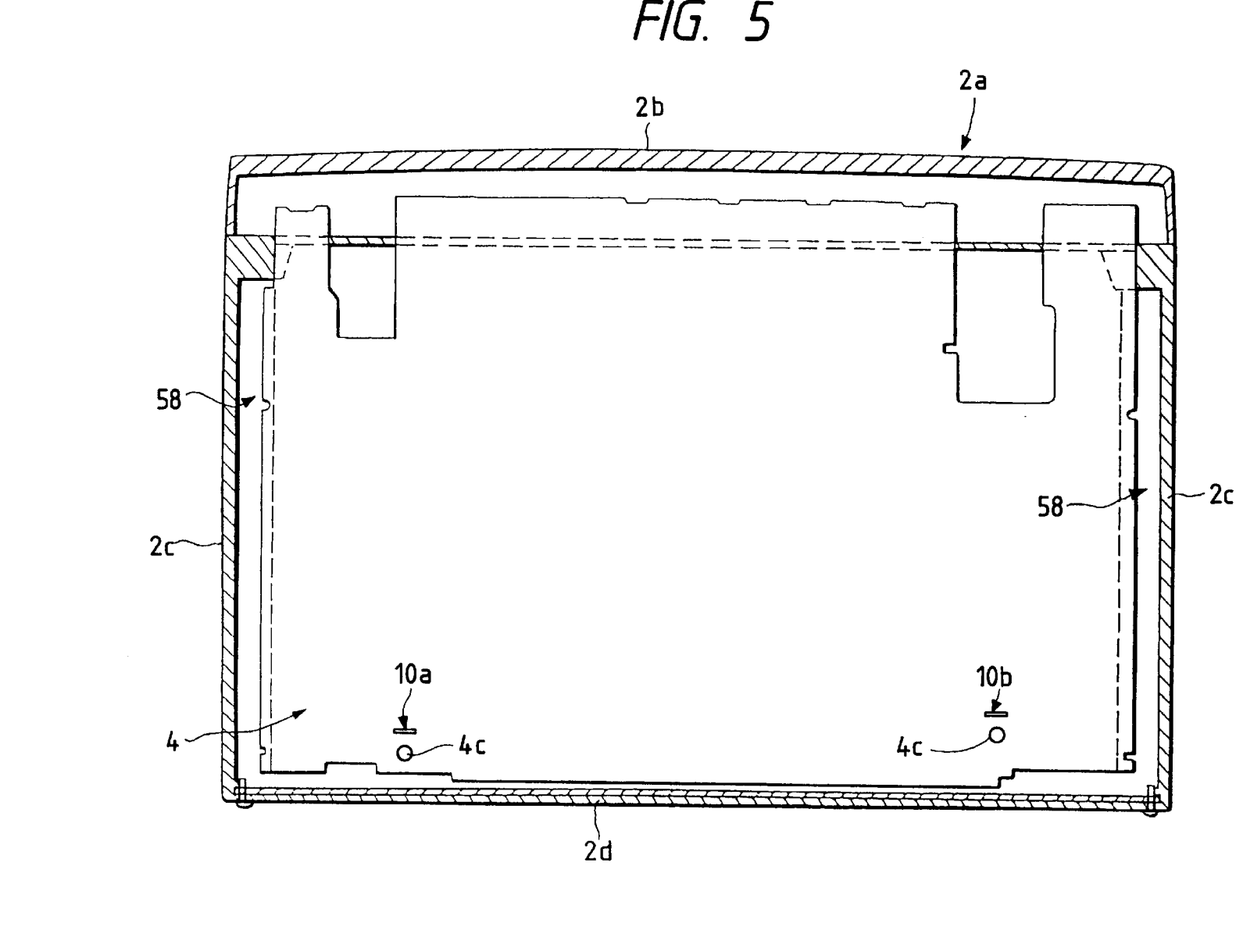
FIG. 5 is a sectional view taken along a line B—B of FIG. 1.

FIG. 4 is a top view of the chassis case 2a confronting the upper cover 2h of the cabinet 2 and FIG. 5 is a sectional view taken along a line B—B of FIG. 1.

Arrays of ribs 58 are made out of synthetic resin on both inner side ends of the chassis case 2a so as to be integral with the side ends. These ribs 58 engage with the chassis case side surfaces 2c in order to adequately ensure the rigidity of the chassis case 2a.

Further, a member (e.g., a metal plate) 4e having such a flat surface portion as to be parallel with the upper surface is arranged, so that the flexing of the upper cover due to vibrations and/or biasing force with respect to the upper surface can be prevented.

Figure 6:
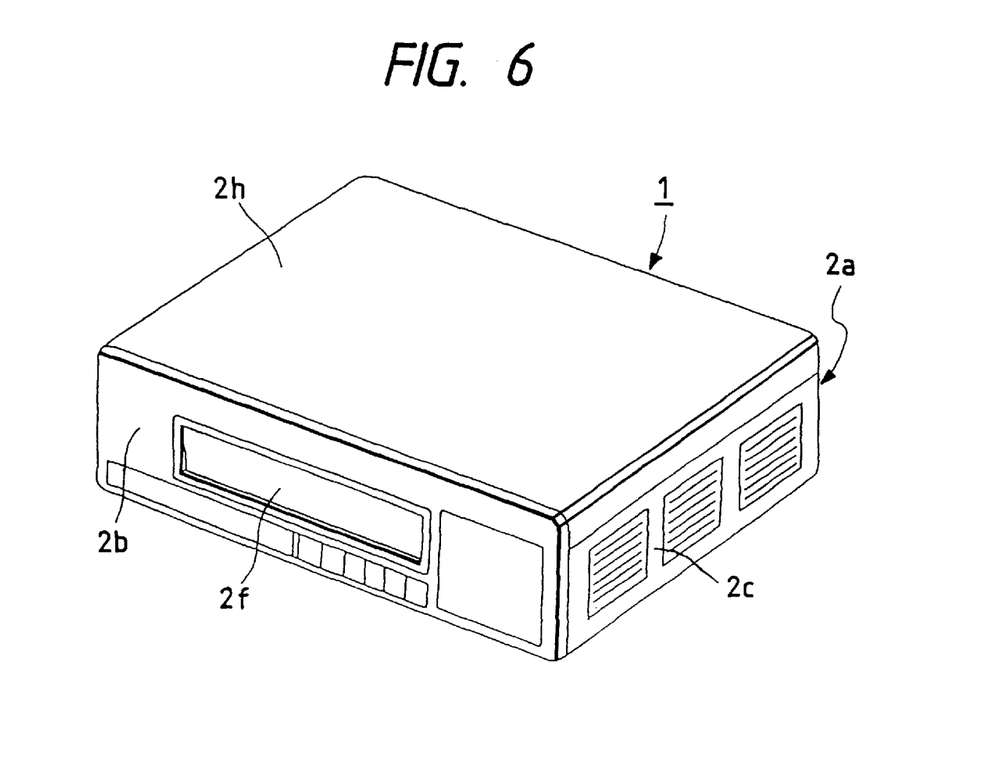
FIG. 6 is a perspective view of the entire part of an electric apparatus according to the embodiment.

In addition, FIG. 6 is a perspective view showing the entire part of a video tape recorder according to the embodiment.

The invention can provide the following advantages.

(1) When a mechanical impact is applied to the cabinet from outside, impact-induced traces are hard to remain if the cabinet is made of the synthetic resin material, whereas impact-induced traces are likely to remain if the cabinet is made of the steel plate. Since the presence of such traces impairs the external appearance of the upper cover in particular, the fact that such traces are hard to remain on the upper cover contributes to reducing the probability of replacing the cabinet due to unattractive traces.

(2) If the chassis case of the cabinet is made of synthetic resin and if the upper cover is made of steel, then a clearance is produced between the chassis case and the upper cover due to a difference between the thermal expansion coefficients of both materials. However, no clearance is produced between the chassis case and the upper cover because both members are made of the same synthetic resin material, contributing to preventing breakdowns of the apparatus caused by dust and the like entering from such clearance.

(3) Since the chassis case of the cabinet and the upper cover thereof are made of the same synthetic resin material, there is no restriction in selecting a color for painting the external surfaces of the cabinet. That is, there is no need for considering such factors as surface roughness, absorbability and adsorbability, and original color of the surface that must be considered by reason of a difference in material. Therefore, the designing of the exterior is simplified, contributing to a cost reduction in coloring. Freedom in selecting the shape is also increased compared with the case where a steel plate is used. The exterior design can be improved compared with the case where a steel plate having a predetermined thickness is used. Since a copper chloride plate or a colored copper plate, in particular, is expensive, the use of a synthetic resin plate contributes to a significant cost reduction. Synthetic resin materials are available in every country in the world.

(4) By making the chassis case of the recessed and projected cabinet and the upper cover thereof out of synthetic resin by molding, the inside of the chassis case and the upper cover can be structured in various forms with ease. Therefore, freedom in designing is increased to a great extent. As a result of this construction, the parts and components within the cabinet can be fixed stably, allowing a reliable cabinet to be provided. Since boards and plates can be fixed through the recessed and projected structure, the number of fixing machine screws used can be reduced.

(5) Efficient shielding can be provided by a locally arranged, irreducibly minimized shield plate against extraneous noise. That is, with respect to noise making electromagnetic waves and electric fields that come from outside, especially, electromagnetic waves and electric fields entering through the upper cover from objects carried on the cabinet, shielding is provided only for a part of the cabinet which critically affects the function of the apparatus main body. With respect to noise making electromagnetic waves and electric fields that enter from the lower side of the cabinet, shielding is provided by the mechanical deck. The downsizing of the apparatus as a whole can also be implemented.

(6) Since the power supply ground terminal and the signal input/output jack ground terminal, which are part of the printed wiring pattern of the board, are grounded utilizing the mechanical deck, the conventional ground plate can be dispensed with, contributing to a parts cost reduction.

(7) Further, the connecting machine screws for grounding these terminals are shared for fixing the upper cover, contributing to a parts reduction.

(8) The fixing machine screw member of the fixing plate of the signal input/output jack can be shared with the upper cover mounting machine screws, also contributing to a parts reduction. Still further, by utilizing the recessed and projected structure of the fixing machine screw member, the fixing plate of the signal input/output jack can be fixed through the recessed and projected structure, also contributing to a fixing parts reduction.

(9) The upper cover is fixed to the upper surfaces of the chassis case through the machine screw holes of the upper cover, and this construction allows the upper cover to be opened with ease whenever necessary.

What is claimed is:

1. A video tape recorder comprising:

a cabinet including a chassis case and an upper cover, the chassis case having a medium inserting opening in a front surface thereof;

a printed wiring board mounting thereon electronic parts for system control, said printed wiring board being accommodated in said cabinet; and a mechanical deck mounting thereon drive mechanisms, said mechanical deck being arranged at a predetermined position on said printed wiring board and being accommodated in said cabinet and said drive mechanisms being arranged to drive a magnetic medium and at least one magnetic head, wherein the chassis case and the upper cover of said cabinet are made of a synthetic resin material, and further comprising shield plate made of a magnetic material for electromagnetically shielding portions of said video tape recorder sensitive to electromagnetic interference, including said at least one magnetic head, from electomagnetic waves coming through a portion of said upper cover, said shield plate being only interposed between the portions of said video tape recorder sensitive to electromagnetic interference and said portion of the upper cover.

2. The video tape recorder according to claim 1, wherein a fixing member is arranged on a back surface of the upper cover of said cabinet, the fixing member being made of the synthetic resin material molded integrally with and projecting from the upper cover and arranged to fix the drive mechanisms within said cabinet.

3. The video tape recorder according to claim 1, wherein a rib is arranged on an inner side of the upper cover, the rib engaging with a side surface of the chassis case.

4. The video tape recorder according to claim 1, wherein a power supply ground terminal and a signal input/output ground terminal are electrically connected to each other through said mechanical deck.

5. The video tape recorder according to claim 1, wherein a power supply ground terminal and a signal input/output ground terminal are electrically connected to said mechanical deck by strips extending from a pattern on said printed wiring board, the power supply ground and signal input/output ground terminals connected to the printed wiring board and said strips being connected to said mechanical deck by machine screws threaded into fixing holes formed in said mechanical deck.

6. The video tape recorder according to claim 1, wherein a power supply ground terminal and a tuner ground terminal are electrically connected to each other through said mechanical deck.

7. The video tape recorder according to claim 1, wherein a power supply ground terminal and a tuner ground terminal are electrically connected to each other by strips extending from a pattern on said printed wiring board, said power supply ground and tuner ground terminals being connected to the printed wiring board and said strips being connected to said mechanical deck by machine screws threaded into fixing holes formed in said mechanical deck.

8. The video tape recorder according to claim 1, further comprising an audio head, amplifier, and electric wire from the audio head to the amplifier accommodated in said cabinet, wherein said at least one magnetic head is arranged to rotate within a cylinder, and the shield plate is designed to shield at least the cylinder, the audio head, and the electric wire from the audio head to the amplifier, from electric interference.

9. The video tape recorder according to claim 1, wherein the shield plate is made of a material that provides electrostatic shielding in addition to said electromagnetic shielding, said shield plate being electrically connected to ground through said mechanical deck.

10. The video tape recorder according to claim 1, further comprising an audio head, amplifier, and electric wire from the audio head to the amplifier accommodated in said cabinet, wherein said at least one magnetic head is arranged to rotate within a cylinder, and the shield plate is designed to shield at least the cylinder, the audio head, and the electric wire from the audio head to the amplifier, from electric interference.

11. The video tape recorder according to claim 1, wherein the shield plate is also arranged to provide shielding from electrical interference for an audio circuit mounted on a rear surface of said printed wiring board.

12. The video tape recorder according to claim 1, further comprising an additional member arranged on an upper portion of said mechanical deck so as to prevent the upper cover from flexing, the member having a flat surface portion extending in parallel with the upper cover.

13. The video tape recorder according to claim 1, wherein the shield plate is a metal plate arranged on an upper portion of said mechanical deck so as to prevent the upper cover from flexing, the shield plate having a flat surface portion extending in parallel with the upper cover.

14. The video tape recorder according to claim 1, further comprising a machine screw member for fixing a fixing plate of a signal input/output terminal and for mounting the upper cover.

15. The video tape recorder according to claim 1, wherein the chassis case is designed to be fixed to the upper cover from the upper cover side using machine screws at side surfaces of the chassis case close to an upper surface of the chassis case.

* * * * *